United States Patent [19]

Vides

[11] Patent Number: 4,718,231
[45] Date of Patent: Jan. 12, 1988

[54] ASSEMBLY FOR HARNESSING WAVE AND TIDE ENERGY

[76] Inventor: Max M. Vides, Capitulo 1, San Salvador, El Salvador

[21] Appl. No.: 576,507

[22] Filed: Feb. 2, 1984

[51] Int. Cl.⁴ ............................................. F03B 13/14
[52] U.S. Cl. ....................................... 60/398; 60/505; 60/506; 60/507
[58] Field of Search ................... 248/274, 280.1, 123.1, 248/325, 364; 60/398, 505, 506, 507; 417/332; 290/42, 53; 92/130 B; 74/142, 143, 590; 901/48; 414/719

[56] References Cited

U.S. PATENT DOCUMENTS

| | | | |
|---|---|---|---|
| 1,385,083 | 7/1921 | McCulley | 60/505 |
| 2,783,022 | 2/1957 | Salzer | 60/505 |
| 3,994,464 | 11/1976 | Perbal et al. | 248/280.1 |
| 4,099,447 | 7/1978 | Ogles | 60/369 |
| 4,319,454 | 3/1982 | Lucia | 60/505 |
| 4,469,955 | 9/1984 | Trepl, II | 60/506 |

Primary Examiner—Edward K. Look
Attorney, Agent, or Firm—Neil F. Markva

[57] ABSTRACT

The assembly comprises an elongated float member which floats on the surface of a body of water having waves moving therealong. A support arm freely pivotally connects to the float member for maintaining the float member parallel to the surface of the water. The support arm member is effective to maintain the float member with its longest dimension disposed in a direction parallel to the length of the waves moving along the surface of the body of water. A transmission assembly is responsive to the support arm member as the float member moves up and down with the movement of the waves to produce a rotational movement in a transmission shaft from which energy may be derived. Various features directed to the specific configuration of the float member, support arm member, transmission mechanism including the structure of a transmission shaft and a clutch mechanism are also disclosed.

8 Claims, 8 Drawing Figures

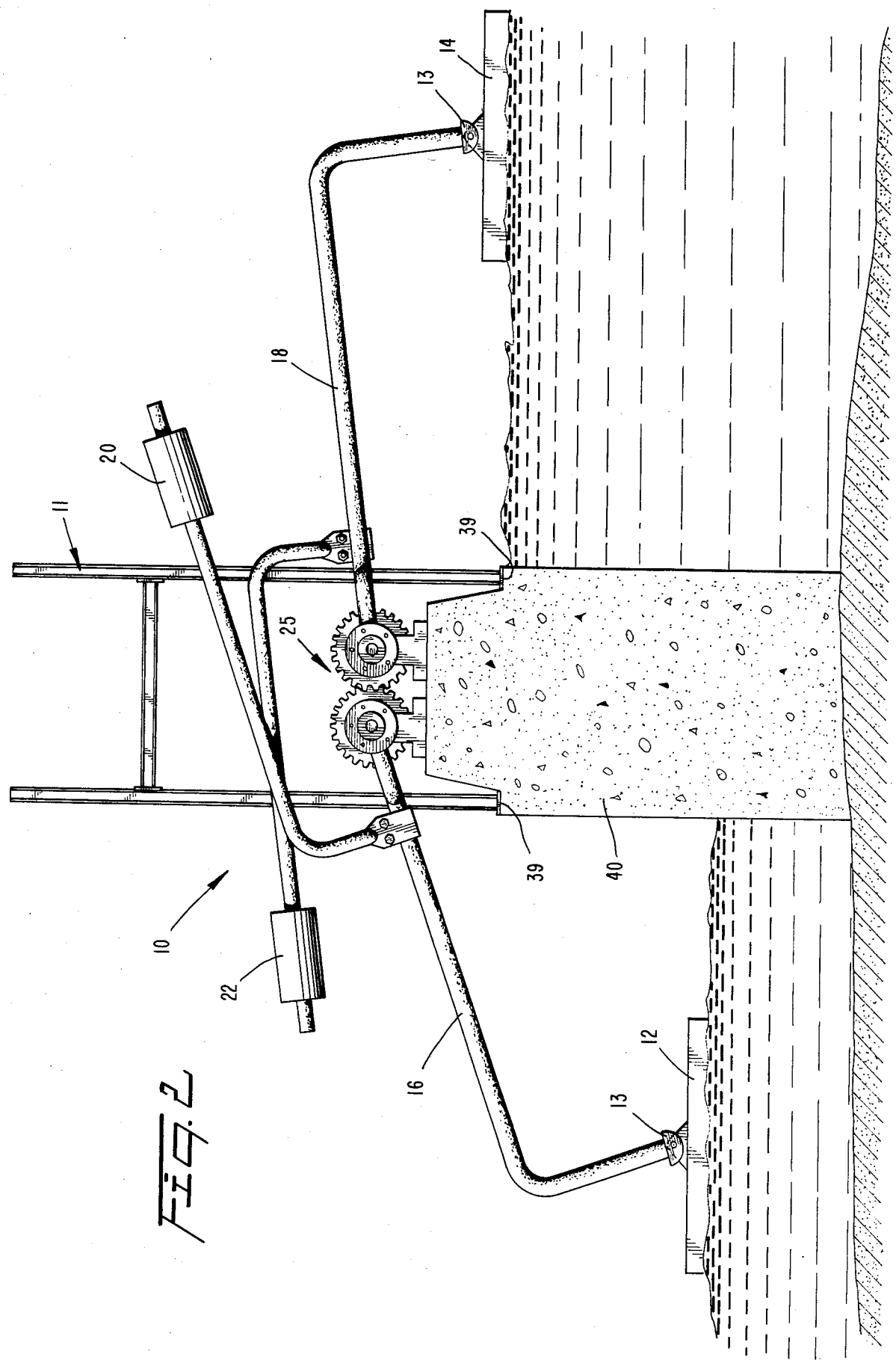

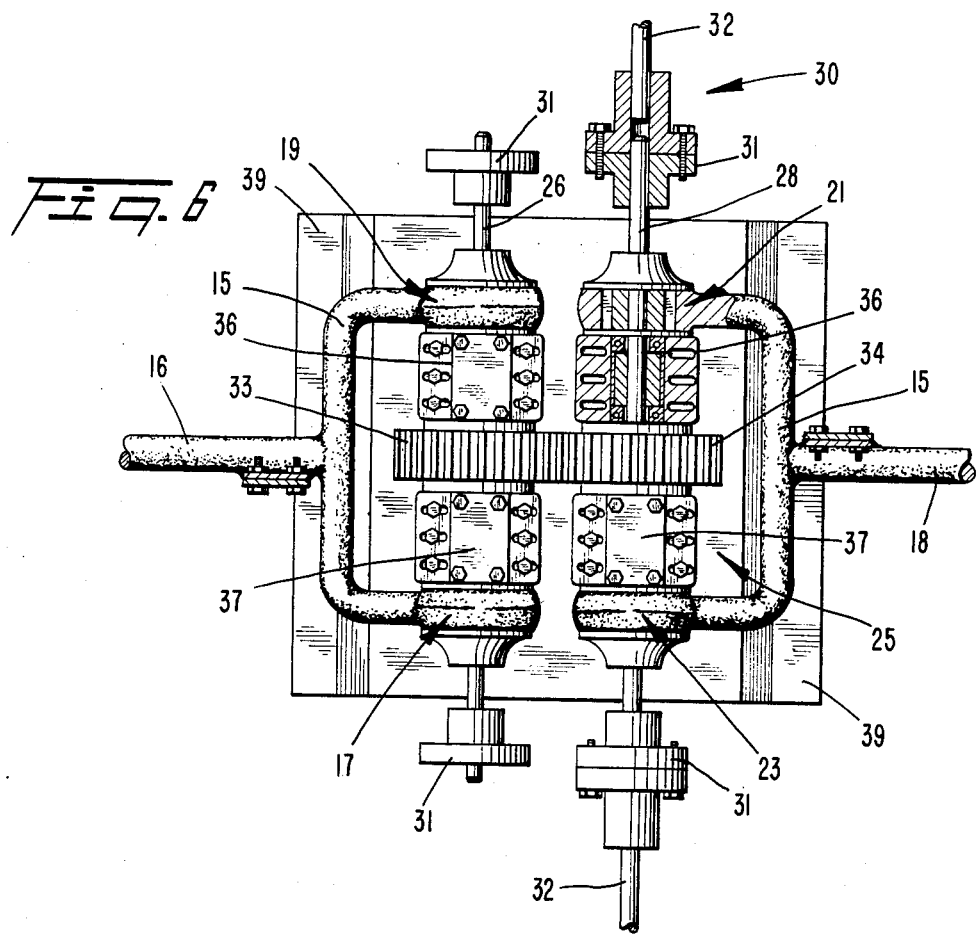
Fig. 6
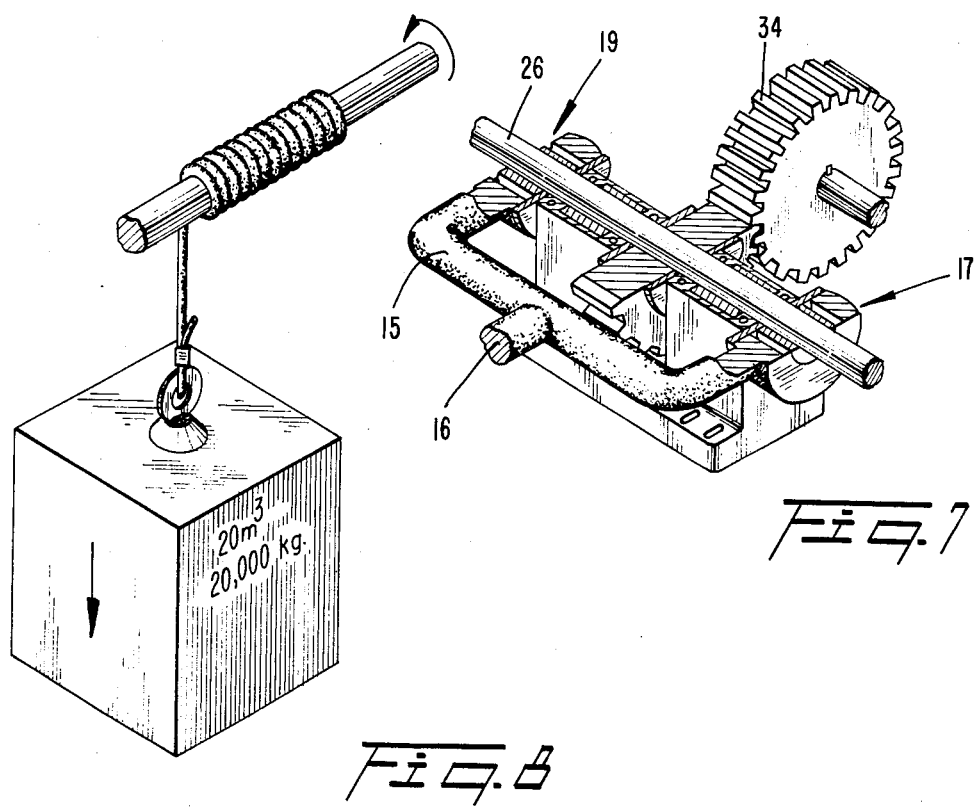
Fig. 7
Fig. 8

ASSEMBLY FOR HARNESSING WAVE AND TIDE ENERGY

FIELD OF THE INVENTION

This invention relates to a mechanism for harnessing wave and tide energy which may be used to operate a power plant. More particularly, the invention is directed to a particular combination of float members, support arms and energy transmission mechanisms which capture the energy derived from the movement of waves along the surface of a body of water.

BACKGROUND OF THE INVENTION

There are many systems that have been proposed to harness the energy of the ocean waves for generating electric power. Examples of the type of system that has been proposed are disclosed in the following U.S. Pat. Nos. 3,808,445; 3,959,663; 3,970,415; 4,009,395; 4,036,563; 4,071,114; 4,091,618; 4,111,610 and 4,145,885.

None of these proposed systems have been found to be effective in obtaining the kind of results that can be achieved in harnessing the power available from the ocean waves and tide.

PURPOSE OF THE INVENTION

The primary purpose of this invention is to provide an assembly for harnessing the power available from the ocean waves and changing tides.

Another object of this invention is to provide a system which is designed to operate 24 hours a day with no fuel consumption and no sea and air contamination.

Another object of the invention is to provide an assembly for harnessing the power available in the changing waves and tide wherein there is a plurality of units having a standard design with all the parts for each one of the units being inter-changeable.

SUMMARY OF THE INVENTION

The assembly as described herein comprises elongated float means for floating on the surface of the body of water having waves moving therealong. Support means freely pivotally connect the float means for maintaining the float means parallel to the surface of the water. The support means is effective to maintain the float means with its longest dimension disposed in a direction parallel to the length of the waves moving along the surface of the body of the water. Transmission means are responsive to the support means as the float means moves up and down with the movement of the waves to produce a rotational movement from which energy may be derived.

The float means has a bottom water contacting surface which is symmetrically disposed across the water contacting surface with respect to a plane that is horizontal and generally parallel to the surface of the body of water. The pivotal connection between the support means and the float means is effective to maintain the parallel relationship between the horizontal plane and the surface of the water as the tide moves in and out and while the waves move along the water body surface.

In a particular embodiment, the support means includes a plurality of arm members each of which arm members has an outer free end that is pivotally connected to a float member. Each arm member also has an inner end connected through a clutch mechanism to a transmission shaft. One feature of the invention includes a pair of parallel transmission shafts supported on heavy bearings located on a concrete base structure anchored in the bottom of the ocean. The base structures are located at a place beyond the wave breaking zone where the waves are the most active along the surface of the ocean. The plurality of arm members interconnect the float members to the pair of parallel transmission shafts on a continuous basis.

A pair of the float members are located on opposing sides of each concrete base structure. Where this type of float arrangement is used, each of the float members is connected to a transmission shaft through a clutch mechanism.

Each clutch mechanism includes a gear carrier shaft section, a gear member fixedly secured to the gear carrier shaft section, bearing means mounted to rotatably support the gear carrier shaft section and one-way drive engagement means. Each of the arm members extending outwardly from either side of the base structure has an inner forked section with connecting points located on opposite sides of the respective clutch mechanism. The one-way drive engagement means is located at each of the connecting points for the inner forked section of the respective arm member. The one-way drive engagement means is effective to drivingly rotate the gear carrier shaft section when a float member connected thereto through the arm member is driven upwardly by a wave moving along the surface of a body of water.

With the arrangement as described hereinabove, where there are parallel transmission shafts, these shafts are engaged through a gear located on the gear carrier shaft section of each clutch mechanism. As each of the floats are pushed upwardly by the action of a wave, one of the parallel shafts moves clockwise and the other shaft moves counter-clockwise. Each of the float mechanisms moves downwardly after the wave passes by the float member on the basis of its own weight.

Each time a float member is raised by the wave, there is a force exerted to the transmission shaft that is equivalent to the weight of the volume of water displaced by the submerged portion of the float member. No energy is obtained when the float member goes to its lower position. However, once it reaches the lowest position, engagement is automatically reset through the clutch mechanism for the next upward motion that is effected when the next wave comes by the float member. With a plurality of float members being laterally displaced along the length of a transmission shaft at various base structures, all of the float members continually contribute to the rotation of the transmission shafts. Each of the float members contribute a certain amount of force to the entire system thereby providing a constant power that is available for generating electrical energy. The size and the total number of floats will determine the amount of available electrical power being generated in the system of the invention.

Another feature of the invention is directed to the use of a plurality of base structures extending outwardly from a shore station into a body of water in a direction transverse to the length of the waves moving along the surface of the body of water. The float units having a pair of float members as described hereinabove have a standard design and are interchangeable at any one of the locations of the base structures. Thus any float can be removed at any time for servicing or replacement without affecting the normal operation of the system. A flange linking mechanism enables the interconnecting transmission shaft sections to be connected where the various base structures may be off center or off line. The configuration of the float members enable an automatic adjustment to be made for low and high tide operation. The base structures also include a pier supporting means on which a pier means may extend outwardly over the clutch mechanisms disposed on each base structure. The pier means rest directly on the pier supporting means of each base structure.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 2 is an end elevational view showing a float unit and transmission mechanism disposed at a base structure made in accordance with this invention;

FIG. 6 is a top plan view partially in section of a double clutch mechanism and a coupling arrangement for parallel transmission shafts in accordance with the invention;

FIG. 7 is a perspective view, partially in section of a clutch mechanism used to drive a transmission shaft in accordance with the present invention, and FIG. 8 is a perspective view of a representation showing the type of power which may be generated using the system of this invention.

DETAILED DESCRIPTION

Figure 1:
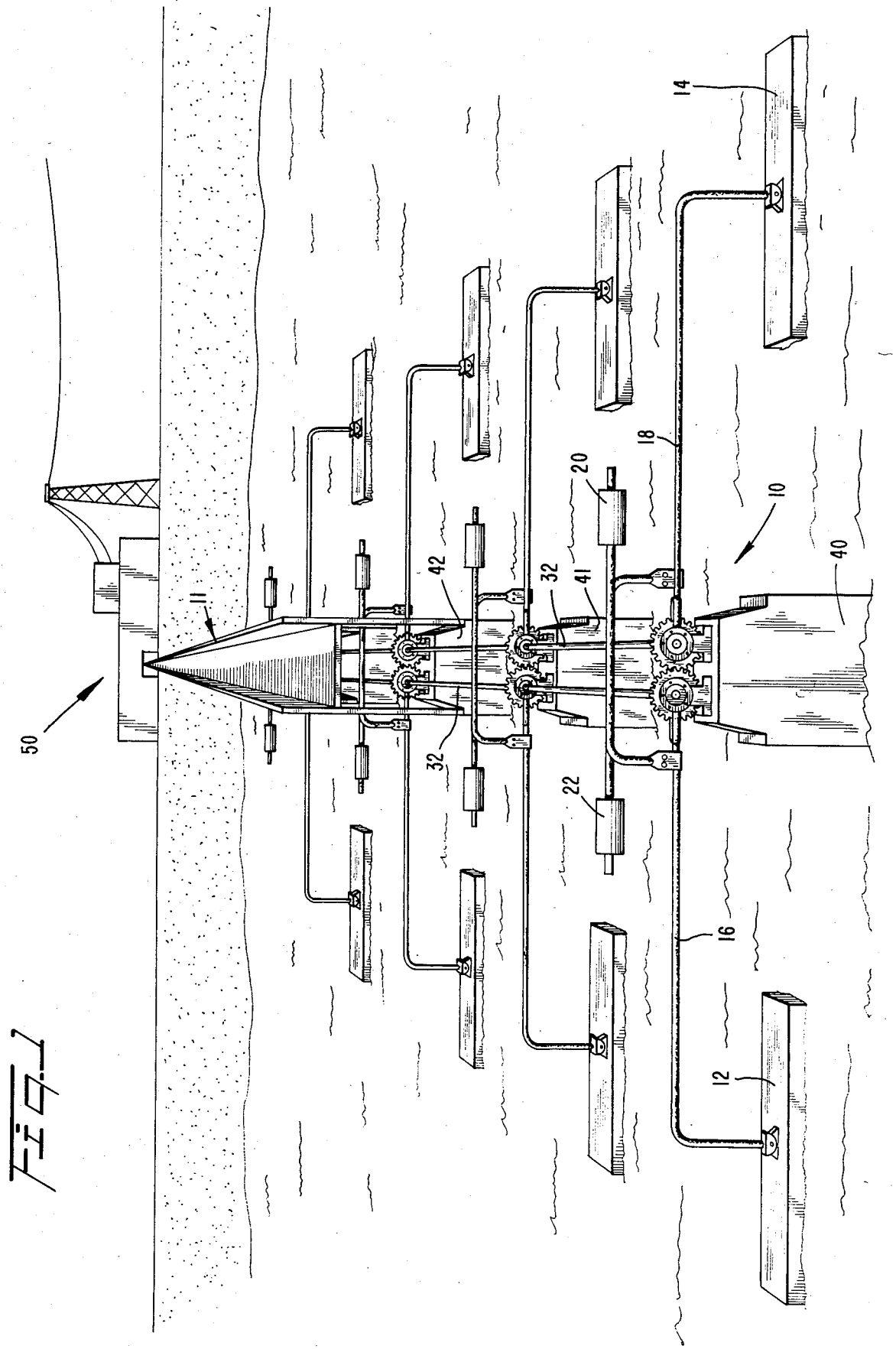
FIG. 1 is a fragmentary perspective view viewed from the outer end of a total assembly made in accordance with this invention.

An assembly for harnessing the energy of the ocean waves to generate electric power is shown in FIG. 1. A plurality of base structures, 40, 41, 42 extend outwardly from a shore station 50 into the body of water in a direction transverse to the length of the waves moving along the surface of the body of water. Each of the base structures, 40, 41 include pier supporting shoulders 39 on which the pier 11 rests. Pier 11 extends outwardly to bridge over the base structures 40, 41, 42 and a clutch mechanism 25 disposed on each of the base structures 40, 41, 42 and the like as shown. Openings are provided in the pier 11 along the sides thereof to enable the movement of the support means as described hereinbelow.

As shown in FIG. 2, an assembly, generally designated 10, includes a pair of float members 12 and 14 supported by arm members 16 and 18, respectively. Pivotal connections 13 connect the support arms 16 and 18 to the respective float members 12 and 14. It is contemplated that the float members 12 and 14 would be constructed of a plastic material that would be impervious to the harsh conditions related to salt sea water.

Each of the float members 12 and 14 have a bottom water contacting surface which is symmetrically disposed across the surface with respect to a horizontal plane that is generally parallel to the surface of the body of water. That is, pivotal connections 13 are effective to maintain the parallel relationship between the horizontal plane and the surface of the water as the tide moves in and out and while the waves move along the water body surface. The purpose of the assembly is to transform the up and down motion of the float members 12 and 14 as they ride along the waves into a rotating motion formed in the transmission shafts 32. As shown each of the float members 12 and 14 are on opposing sides of the base structure 40. The clutch mechanism 25 enables the transmission shaft 32 to be rotated when the float members 12 and 14 move upwardly. The clutch mechanism allows the float member 12 and 14 to then move downwardly unimpeded by any drag in the clutch system. In other words, the weight of the float members 12 and 14 respond to gravitation once the wave passes the location of the float members. The float members should be sufficiently large to displace enough water volume for substantial power transference to the transmission shaft. In this particular embodiment, the float members are rectangular and have a width of from about 3 to 6 feet and a length of from about 10 to 15 feet long.

Counterbalance weights 20 and 22 located at a position opposite the transmission shaft 32 to which the respective arm members 16 and 18 are connected compensate for a significant portion of the dead weight of the arms 16 and 18. As shown in FIG. 2, the float 12 represents a condition which would be likened to a wave having just passed by while the float member 14 is riding the crest of a wave. The large plurality of float members continually acting in an up and down fashion as the waves pass the location of those float members each contribute a certain amount of force to the entire transmission system. This, then, determines a constant power coming available at all times at the power station 50 located on the shore.

Figure 5:
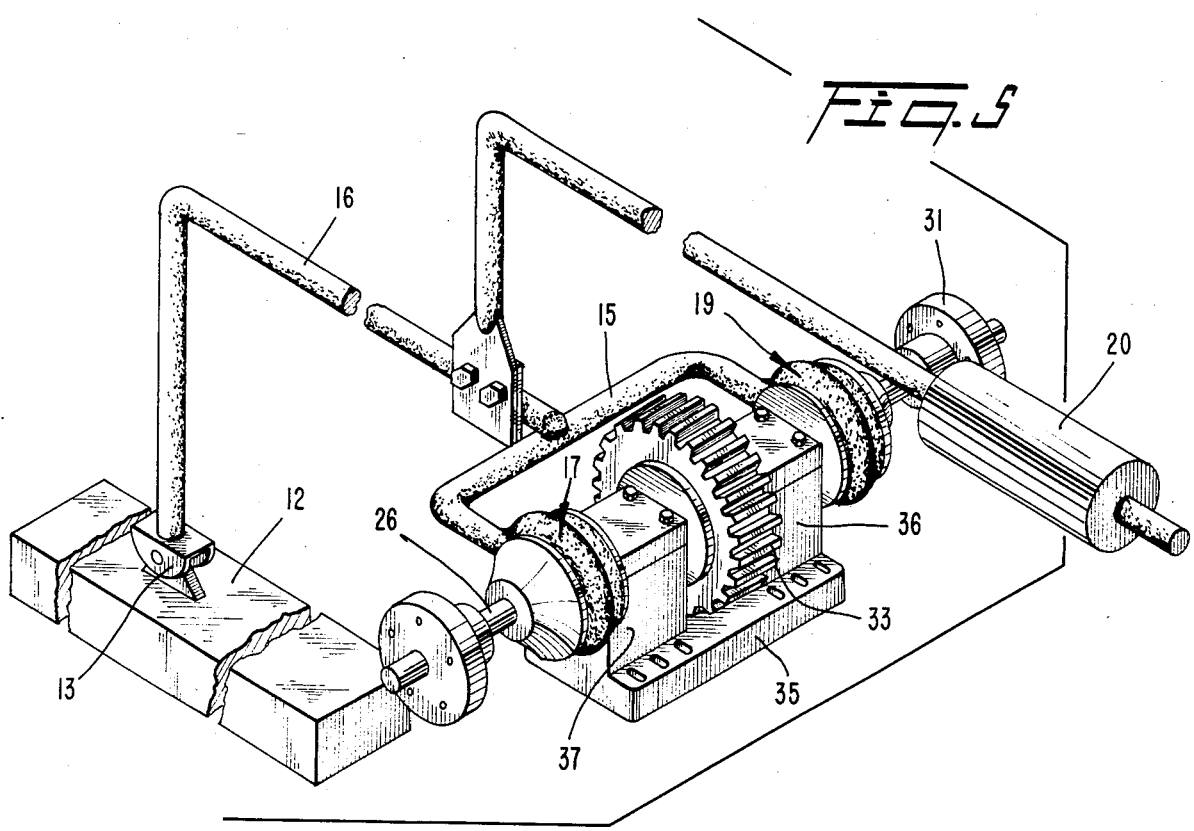
FIG. 5 is a fragmentary perspective view of an assembly comprising a float member, support arm member, clutch mechanism and transmission shaft made in accordance with this invention.
Figure 3:
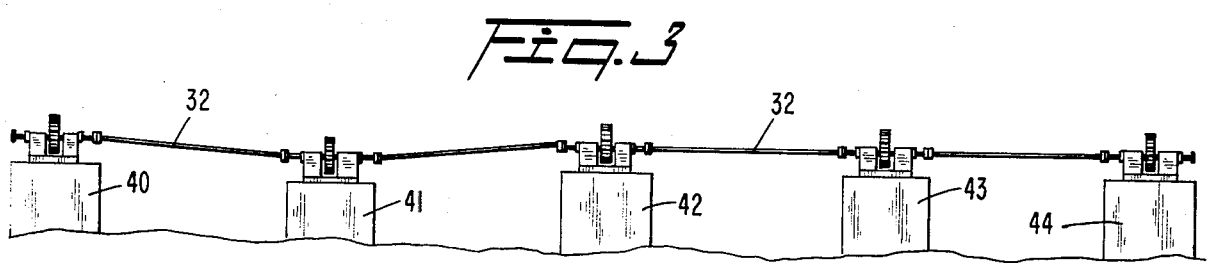
FIG. 3 is a side elevational view of an overall assembly showing the interconnection of a plurality of base structures without the float members shown for clarity.
Figure 4:
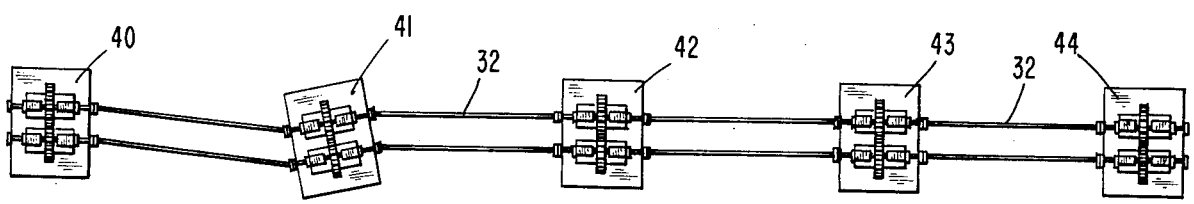
FIG. 4 is a top plan view of the arrangement as shown in FIG. 3.

The details of the linkage mechanism in conjunction with the clutch mechanism of this invention is shown in FIGS. 5, 6 and 7. Each clutch mechanism 25 includes a gear carrier shaft section 26 and 28, a gear member 33 and 34 fixedly secured to the respective gear carrier shaft sections 26 and 28, bearing assemblies 36 and 37 mounted to rotatably support the gear carrier shaft sections 26 and 28 and one-way drive engagement means 17, 19 and 21, 23. The inner end of each arm member 16 and 18 has an inner forked section 15 with connecting points located on opposite sides of the respective clutch mechanism 25. The one-way drive engagement mechanism 17, 19 and 21, 23 is designed in a standard fashion and is located at each of the connecting points for the inner forked section 15 of the arm members 16 and 18. The one-way drive engagement means are effective to drivingly rotate the gear carrier shaft sections 26 and 28 when a float member 12 or 14 connected thereto through the respective arm member 16 or 18 is driven upwardly by a wave moving along the surface of a body of water. The gear members 33 and 34 are fixedly secured to the respective gear carrier shaft sections 26 and 28 and thus the meshed gears cause the transmission shafts to turn in opposite directions. Thus, one of the shafts will turn in a clockwise direction while the other shaft turns in a counter-clockwise direction.

Each of the units found on the respective base structures 40, 41, 42, 43 and 44 are interconnected by the transmission shaft sections 32. The interconnection is made at the flange arrangements, generally designated 30. Each of the gear carrier shaft sections 26 and 28 carries a flange member 31 at either end thereof. A further flange member is connected to the end of each of the transmission shaft sections 32 and then simply interconnected with suitable fastening means as shown in FIG. 6. The flange engagements 30 enable the base structures 40-41 to be out of alignment and still be able to rotate the shafts 32. The invention of the present application, all of the various parts are designed to be interchangeable. Thus, any one float assembly can be removed at any time for servicing and replacement without affecting the normal operation of the system.

The force exerted on both float members 12 and 14 is collected at either of the transmission shafts 32 and communicated through the entire length of the shafts 32 to the rest of the operating units. An estimation of the amount of power available is shown in accordance with the following calculation. A light float member made out of a material such as plastic and measuring 2 meters in width by 5 meters in length and having a height of 1 meter will represent 10 cubic meters of volume. To submerge such a float member into the water at a depth of 0.10 meters, it would require the equivalent of one metric ton or 1,000 kilograms. Thus, each time such a float member is submerged 0.1 meter, there is a requisite force of 1,000 kilograms that will be applied to the transmission system. Thus, for every 0.1 meters of submerged portion of the float, there will be a manifestation of 1,000 kilograms of force added to the transmission shaft 32 of the system.

An estimation of the constant power available along the transmission shaft is presented in the example shown in FIG. 8. Assuming a system made in accordance with this invention having 60 float units with only ⅓ of those float units delivering force to the shaft at any one time while being submerged only 0.25 centimeters will provide the following torque force. In this instance, the float unit would be four meters long by one meter in width by 0.5 meters in height. If each of the twenty float members having such dimension were submerged 0.25 centimeters, a constant force will be delivered along the transmission shafts 32 equivalent to the weight of 20 cubic meters of water or 20,000 kilograms. The base structure configurations form an anchorage system which provides a firm support along the bottom of the ocean for the floating and transmission systems of the present invention. The base structures are laid into the ocean far enough to allow the floating units to operate beyond the wave breaking area. Further, the base structures are designed so as to not block the waves along their travel to the beach. The power conversion system simply transforms the high torque-low speed of the transmission shaft into a stabilized steady rotation capable of generating any 50 or 60 cycle AC electrical energy.

While the assembly for harnessing wave and tide energy has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An assembly for harnessing wave and tide energy, said assembly comprising:
   (a) an elongated float means for floating on the surface of a body of water having waves moving therealong,
   (b) support means freely pivotally connected to the float means for maintaining the float means parallel to the surface of the water,
   (c) said support means being effective to maintain said float means with its longest dimension disposed in a direction parallel to the length of the waves moving along the surface of the body of the water,
   (d) transmission means including two parallel transmission shafts responsive to the support means as the float means moves up and down with the movement of the waves to produce a rotational movement from which energy may be derived,
   (e) said support means including two arm members each having an outer free end pivotally connected to the float means and having counterweight means located at the other inner end thereof which counterweight means extends to an opposing side of the transmission shaft with respect to the corresponding float means to neutralize a portion of the weight of the float means and arm member,
   (f) a plurality of base structures fixedly disposed on the bottom of the body of water with the transmission means located on the base structures that are laterally displaced with respect to each other and extend outwardly from a shore station into the body of water in a direction transverse to the length of the waves moving along the surface of the body of water,
   (g) the base structures including pier supporting means, and
   (h) pier means resting on said pier supporting means and extending outwardly to bridge over the transmission means located on said plurality of base structures,
   (i) the transmission means including a double clutch mechanism disposed on the base structures and the two parallel transmission shafts extending between each adjacent two clutch mechanisms carried by said base structures, and
   (j) each of the two arm members has an inner forked section each being connected at their inner ends to a respective transmission shaft located on opposite sides of a respective double clutch mechanism located on a base structure.

2. An assembly as defined in claim 1 wherein
said float means has a bottom water contacting surface which is symmetrically disposed across said surface with respect to a plane that is horizontal and generally parallel to the surface of the body of water,
said pivotal connection being effective to maintain the parallel relationship between the horizontal plane and the surface of the water as the tide moves in and out while the waves move along said water body surface.

3. An assembly as defined in claim 1 wherein
said double clutch mechanism is effective to produce a one-way rotation of the transmission shafts as the arm members move up and down with the float means.

4. An assembly as defined in claim 1 wherein
the float means includes a plurality of float members laterally displaced along the length of the transmission shafts.

5. An assembly as defined in claim 1 wherein
the double clutch mechanism is effective to rotate one of the transmission shafts in a clockwise rotation and the other transmission shaft in a counter-clockwise rotation, said transmission shafts being effective to accumulate the energy obtained from each of the float members interconnected thereto through the respective arm members and double clutch mechanism.

6. An assembly as defined in claim 1 wherein the double clutch mechanism is disposed on the base structure with each transmission shaft including an interchangeable linkage section removably coupled to the clutch mechanism.

7. An assembly as defined in claim 1 wherein each of the base structures includes a pier supporting means, and the pier means extends over the clutch mechanisms disposed on each structure and rests on the pier supporting means of each base structure.

8. An assembly as defined in claim 1 wherein each clutch mechanism includes a gear carrier shaft section, a gear member fixedly secured to the gear carrier shaft section, bearing means mounted to rotatably support the gear carrier shaft section and one-way drive engagement means located at each of the connecting points for the inner forked section of the arm member, said one-way drive engagement means being effective to drivingly rotate a gear carrier shaft section when a float member connected thereto through said arm member is driven upwardly by a wave moving along the surface of a body of water.

* * * * *